(12) United States Patent
Smith

(10) Patent No.: US 9,287,663 B1
(45) Date of Patent: Mar. 15, 2016

(54) ELECTRICAL CONNECTOR AND METHOD OF ELECTRICALLY COUPLING FIRST AND SECOND ELECTRICAL TERMINALS OF FIRST AND SECOND BATTERY CELLS TO ONE ANOTHER

(71) Applicant: LG Chem, Ltd., Seoul (KR)

(72) Inventor: Alexander Jeffrey Smith, White Lake, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/468,409

(22) Filed: Aug. 26, 2014

(51) Int. Cl.
*H01R 4/24* (2006.01)
*H01R 13/631* (2006.01)
*H01R 43/26* (2006.01)
*H01R 13/10* (2006.01)

(52) U.S. Cl.
CPC .............. *H01R 13/631* (2013.01); *H01R 13/10* (2013.01); *H01R 43/26* (2013.01)

(58) Field of Classification Search
CPC ............. H01R 13/6275; H01R 4/2429; H01R 4/2433; H01R 9/0757; H01R 12/592; H01R 12/79; H01R 23/662
USPC ......... 439/345, 395, 404, 405, 494, 495, 497, 439/499
See application file for complete search history.

(56) References Cited

U.S. PATENT DOCUMENTS

| | | | | |
|---|---|---|---|---|
| 4,127,312 A | * | 11/1978 | Fleischhacker ...... | H01R 13/112 439/403 |
| 4,194,803 A | | 3/1980 | Hatch | |
| 4,484,791 A | * | 11/1984 | Johnson ............... | H01R 12/675 439/404 |
| 4,552,429 A | * | 11/1985 | van Alst ............... | H01R 4/2429 439/392 |
| 4,668,039 A | * | 5/1987 | Marzili ................ | H01R 12/675 439/404 |
| 4,747,787 A | | 5/1988 | Siwinski | |
| 5,147,218 A | * | 9/1992 | Matthews ............ | H01R 4/2429 439/404 |
| 5,178,558 A | * | 1/1993 | Knox ................... | H01R 4/2433 439/404 |
| 5,683,268 A | * | 11/1997 | Drach .................. | H01R 4/2429 439/404 |
| 5,902,147 A | * | 5/1999 | Jochen ................ | H01R 12/675 439/405 |
| 6,027,362 A | * | 2/2000 | LaCroix ............... | H01R 4/2429 439/404 |
| 6,074,237 A | * | 6/2000 | Lee ...................... | H01R 4/2433 439/358 |
| 6,098,284 A | | 8/2000 | Price | |
| 6,193,541 B1 | * | 2/2001 | Lee ...................... | H01R 12/675 439/358 |
| 6,203,359 B1 | * | 3/2001 | Lee ..................... | H01R 13/5812 439/405 |
| 6,666,706 B1 | * | 12/2003 | Jones ................... | H01R 13/506 439/353 |

\* cited by examiner

*Primary Examiner* — Thanh Tam Le
(74) *Attorney, Agent, or Firm* — Buckert Patent & Trademark Law Firm, PC; John F. Buckert

(57) ABSTRACT

An electrical connector includes a first terminal assembly having a first pin assembly with a first plurality of pins and a second plurality of pins is provided. The electrical connector includes a first end cap attached to the first terminal assembly to urge a first electrical terminal against the first plurality of pins such that the first plurality of pins extend through and contact the first electrical terminal. The electrical connector includes a second terminal assembly having a first pin assembly with a first plurality of female pins and a second plurality of pins. The electrical connector includes a second end cap attached to the second terminal assembly to urge a second electrical terminal against the second plurality of pins of the first pin assembly of the second terminal assembly such that the second plurality of pins of the first pin assembly of the second terminal assembly extend through and contact the second electrical terminal.

12 Claims, 17 Drawing Sheets

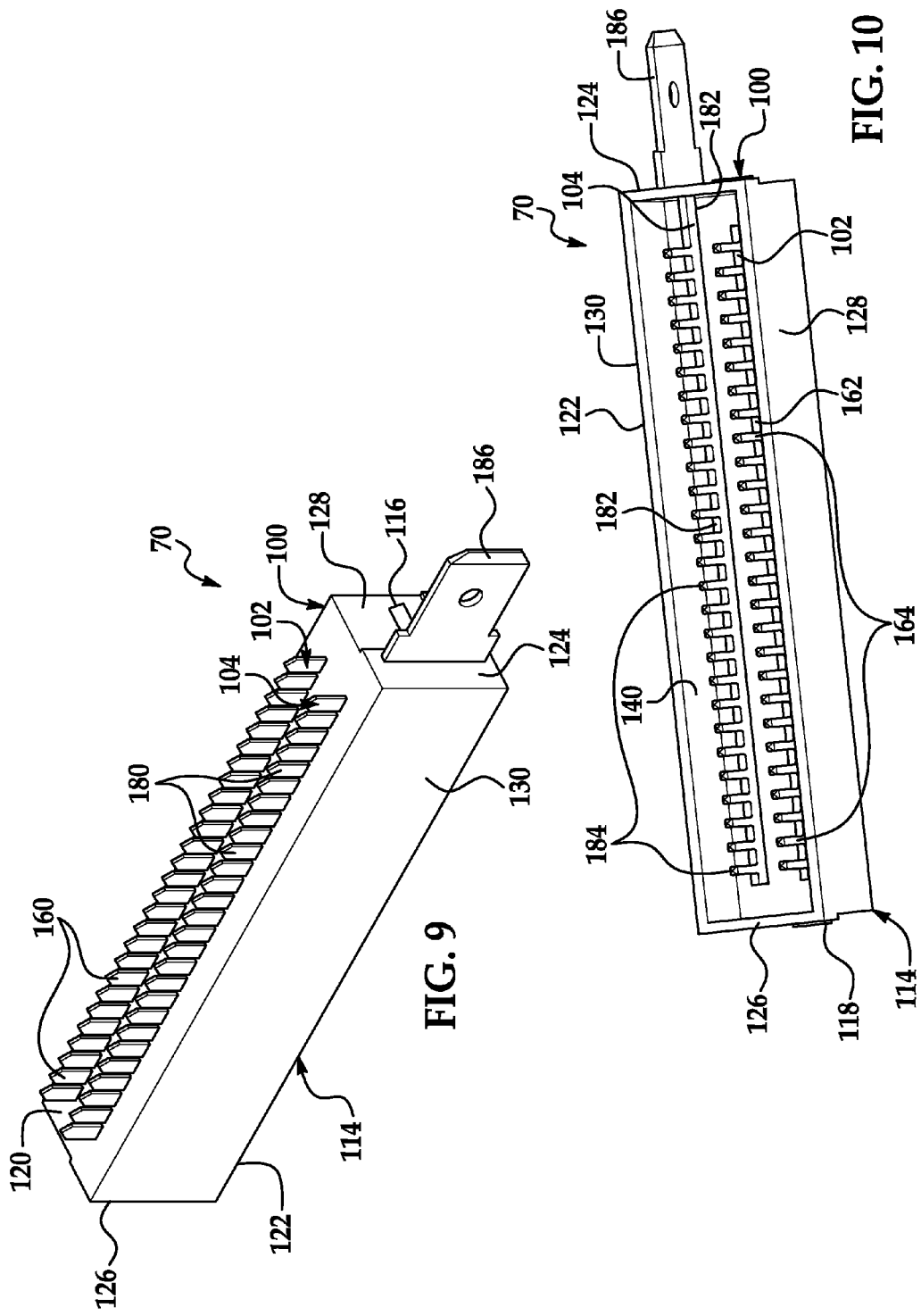

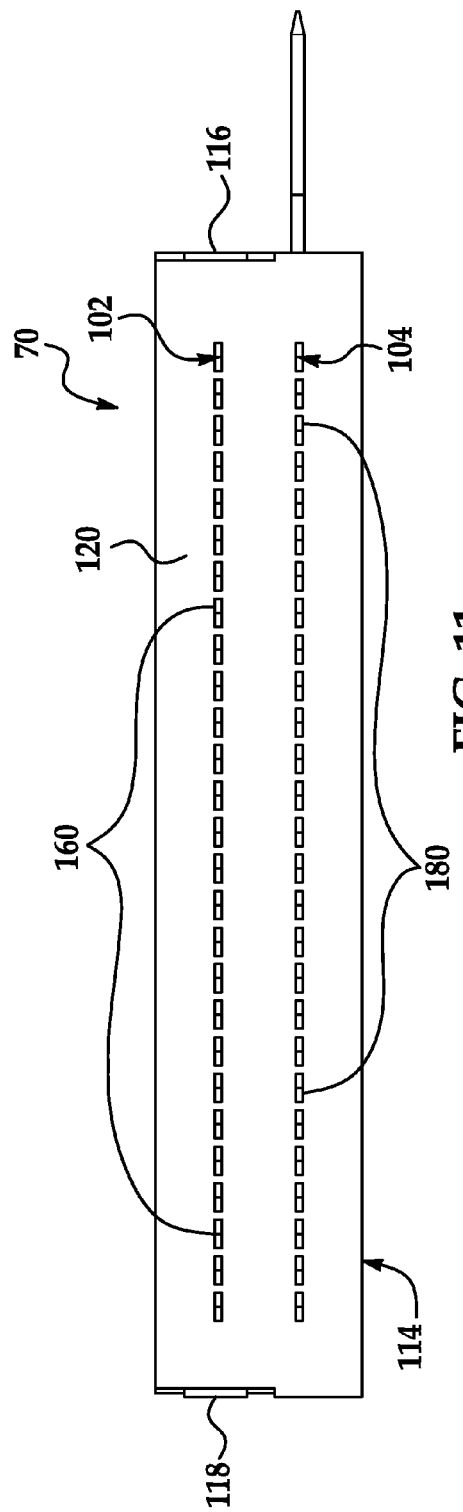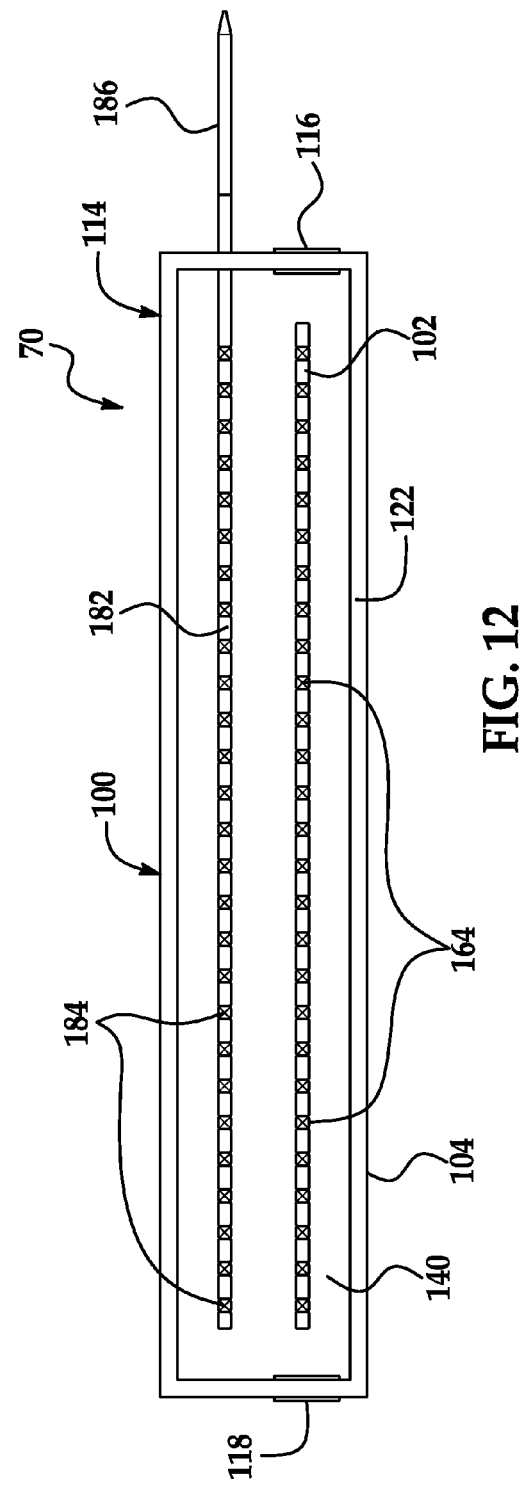

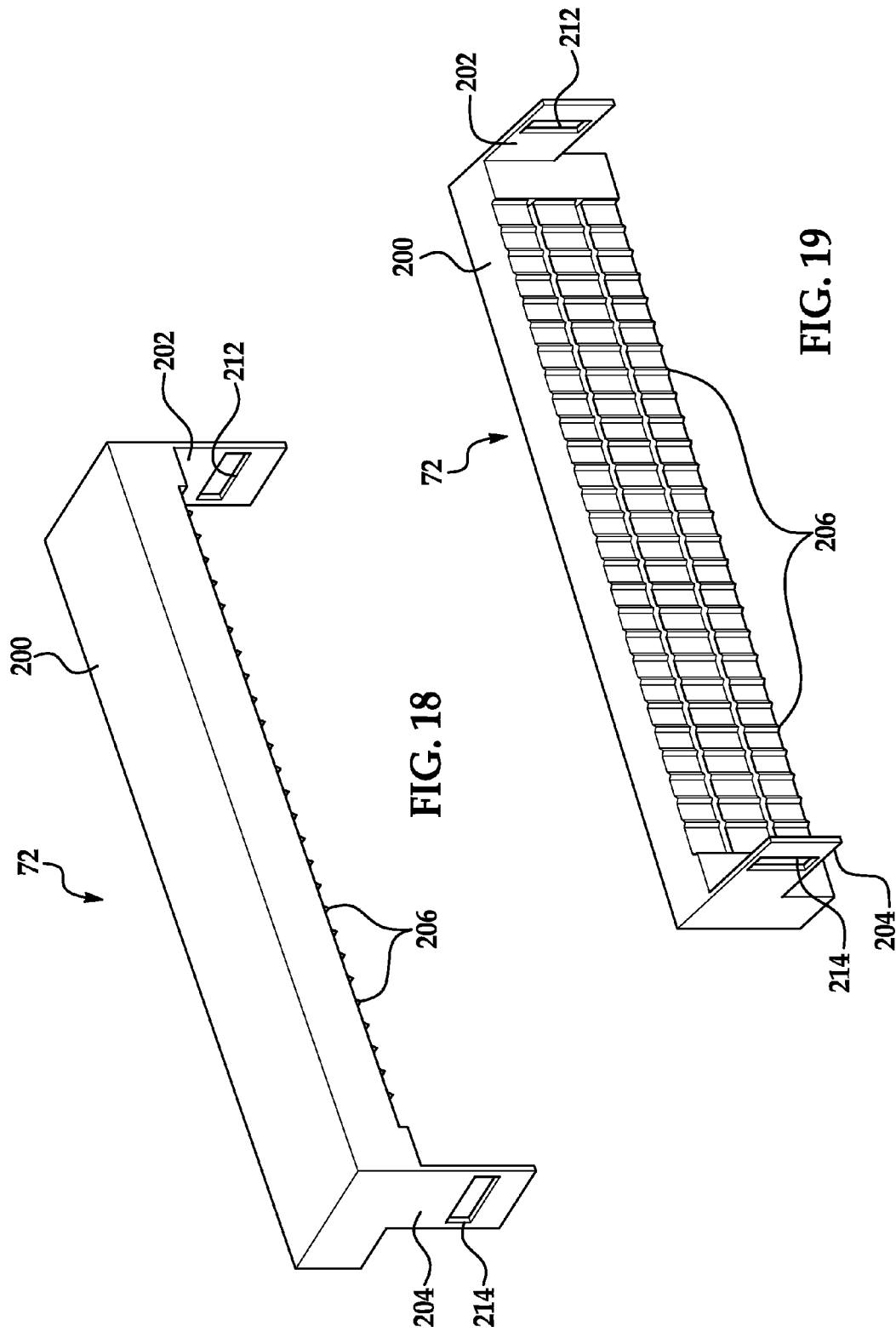

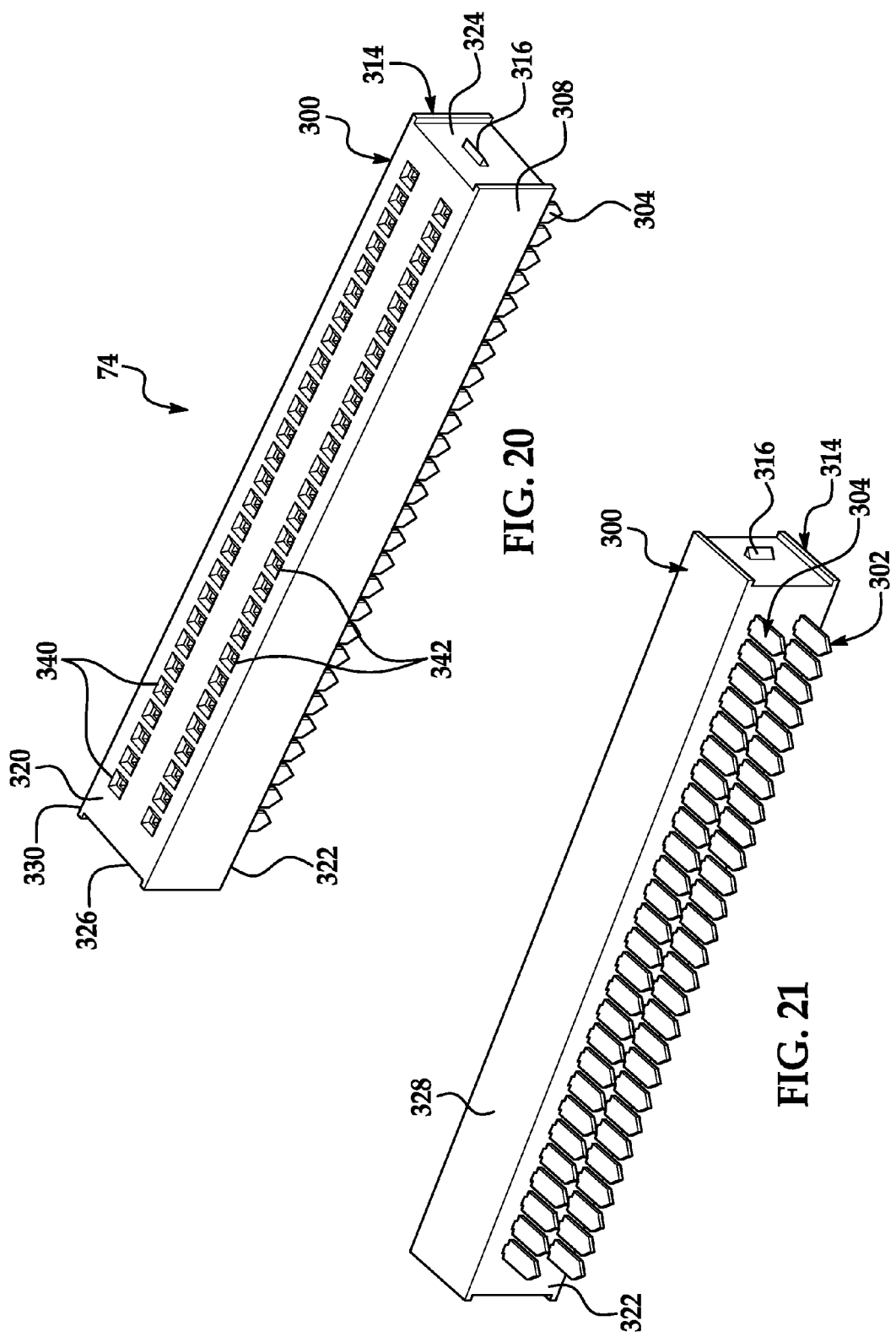

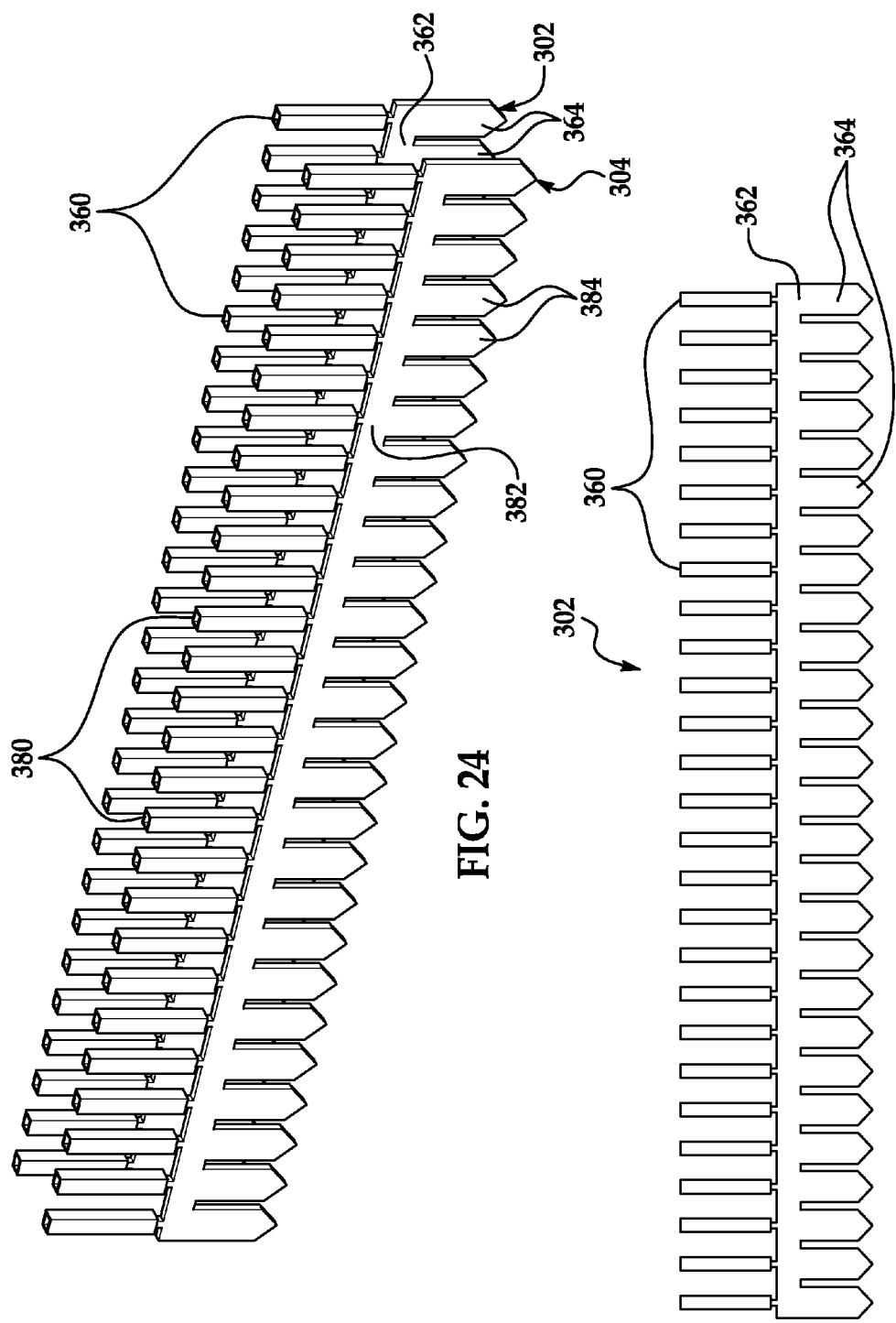

ELECTRICAL CONNECTOR AND METHOD OF ELECTRICALLY COUPLING FIRST AND SECOND ELECTRICAL TERMINALS OF FIRST AND SECOND BATTERY CELLS TO ONE ANOTHER

BACKGROUND

The inventor herein has recognized a need for an improved electrical connector and an improved method of electrically coupling first and second electrical terminals of first and second battery cells, respectively, to one another.

SUMMARY

An electrical connector in accordance with an exemplary embodiment is provided. The electrical connector includes a first terminal assembly having a first pin assembly with a first plurality of pins and a second plurality of pins. The first plurality of pins are electrically coupled together. The second plurality of pins of the first terminal assembly are electrically coupled together. The first plurality of pins are electrically coupled to the second plurality of pins of the first terminal assembly. The electrical connector further includes a first end cap that is removably attached to the first terminal assembly to urge a first electrical terminal against the first plurality of pins such that the first plurality of pins extend through and contact the first electrical terminal, and the first electrical terminal is held between the first end cap and the first terminal assembly. The electrical connector further includes a second terminal assembly having a first pin assembly with a first plurality of female pins and a second plurality of pins. The first plurality of female pins are electrically coupled together. The second plurality of pins of the second terminal assembly are electrically coupled together, and the first plurality of female pins are electrically coupled to the second plurality of pins of the second terminal assembly. Each female pin of the first plurality of female pins are configured to receive a respective pin of the second plurality of pins of the first terminal assembly therein. The electrical connector further includes a second end cap that is removably attached to the second terminal assembly to urge a second electrical terminal against the second plurality of pins of the first pin assembly of the second terminal assembly such that the second plurality of pins of the first pin assembly of the second terminal assembly extend through and contact the second electrical terminal, and the second electrical terminal is held between the second end cap and the second terminal assembly.

A method of electrically coupling first and second electrical terminals of first and second battery cells, respectively, to one another in accordance with another exemplary embodiment is provided. The method includes providing a first terminal assembly having a first pin assembly with a first plurality of pins and a second plurality of pins. The first plurality of pins are electrically coupled together, the second plurality of pins of the first terminal assembly are electrically coupled together, and the first plurality of pins are electrically coupled to the second plurality of pins of the first terminal assembly. The method further includes providing a second terminal assembly having a first pin assembly with a first plurality of female pins and a second plurality of pins. The first plurality of female pins are electrically coupled together. The second plurality of pins of the second terminal assembly are electrically coupled together, and the first plurality of female pins are electrically coupled to the second plurality of pins of the second terminal assembly. The method further includes providing first and second end caps. The method further includes attaching the first end cap to the first terminal assembly to urge the first electrical terminal against the first plurality of pins of the first pin assembly such that the first plurality of pins of the first terminal assembly extend through and contact the first electrical terminal, and the first electrical terminal is held between the first end cap and the first terminal assembly. The method further includes disposing each pin of the second plurality of pins of the first terminal assembly in a respective female pin of the first plurality of female pins of the first pin assembly of the second terminal assembly. The method further includes attaching the second end cap to the second terminal assembly to urge the second electrical terminal against the second plurality of pins of the first pin assembly of the second terminal assembly such that the second plurality of pins of the first pin assembly of the second terminal assembly extend through and contact the second electrical terminal, and the second electrical terminal is held between the second end cap and the second terminal assembly.

BRIEF DESCRIPTION OF THE DRAWINGS

FIG. 9 is a schematic of a first terminal assembly utilized in the electrical connector of FIG. 1;

FIG. 10 is another schematic of the first terminal assembly of FIG. 9;

FIG. 11 is a top view of the first terminal assembly of FIG. 9;

FIG. 12 is a bottom view of the first terminal assembly of FIG. 9;

FIG. 18 is a schematic of a first end cap utilized in the battery cell assembly of FIG. 1;

FIG. 19 is another schematic of the first end cap of FIG. 18;

FIG. 20 is a schematic of a second terminal assembly utilized in the electrical connector of FIG. 1;

FIG. 21 is another schematic of the second terminal assembly of FIG. 20;

FIG. 24 is a schematic of first and second pin assemblies utilized in the second terminal assembly of FIG. 20;

FIG. 25 is a side view of the first pin assembly of FIG. 24;

DETAILED DESCRIPTION

Figure 1:
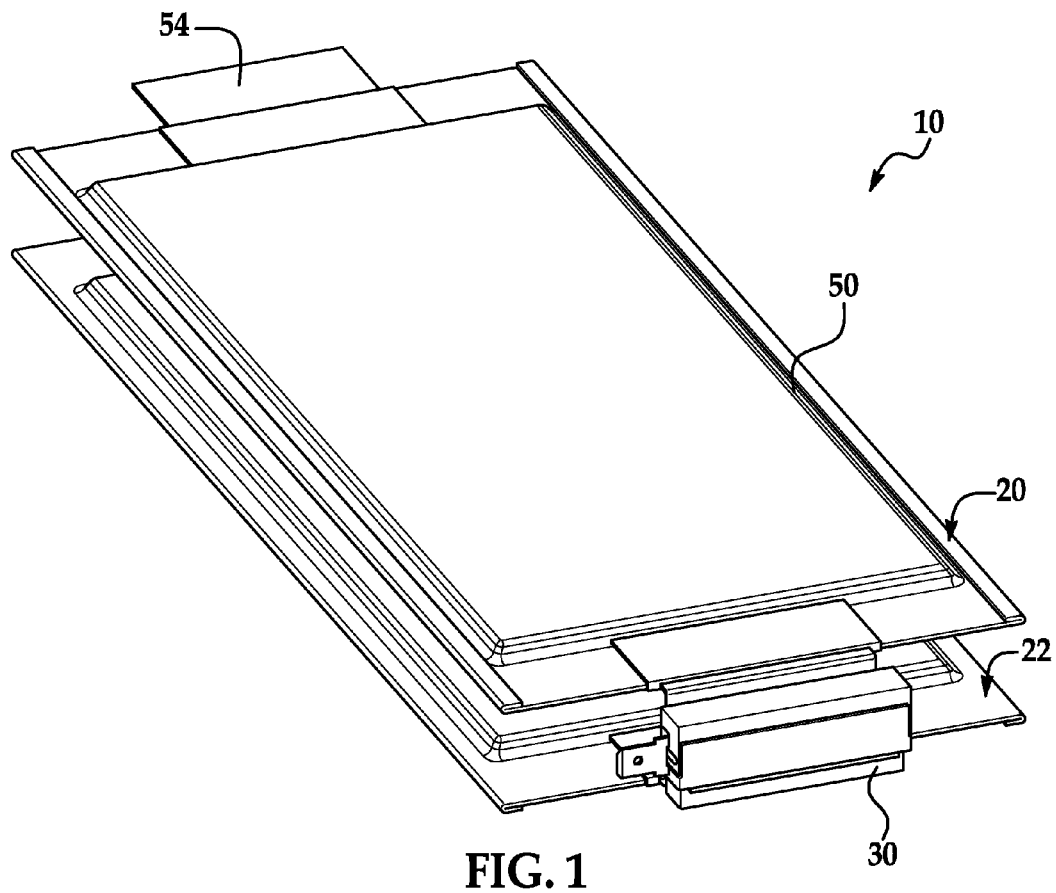
FIG. 1 is a schematic of a battery cell assembly having first and second battery cells and an electrical connector in accordance with an exemplary embodiment.

Referring to FIGS. 1-8, a battery cell assembly 10 having battery cells 20, 22 and an electrical connector 30 in accordance with an exemplary embodiment is provided. The electrical connector 30 physically and electrically couples the battery cells 20, 22 to one another as will be explained in greater detail below.

The battery cell 20 includes a body portion 50 and electrical terminals 52, 54. The electrical terminals 52, 54 extend from first and second ends, respectively of the body portion 50. The battery cell 20 generates an operational voltage between the electrical terminals 52, 54. In an exemplary embodiment, the battery cell 20 is a lithium-ion pouch-type battery cell. Of course, in an alternative embodiment, other types of battery cells could be utilized.

The battery cell 22 includes a body portion 60 and electrical terminals 62, 64. The electrical terminals 62, 64 extend from first and second ends, respectively of the body portion 60. The battery cell 22 generates an operational voltage between the electrical terminals 62, 64. In an exemplary embodiment, the battery cell 22 is a lithium-ion pouch-type battery cell. Of course, in an alternative embodiment, other types of battery cells could be utilized.

Figure 2:
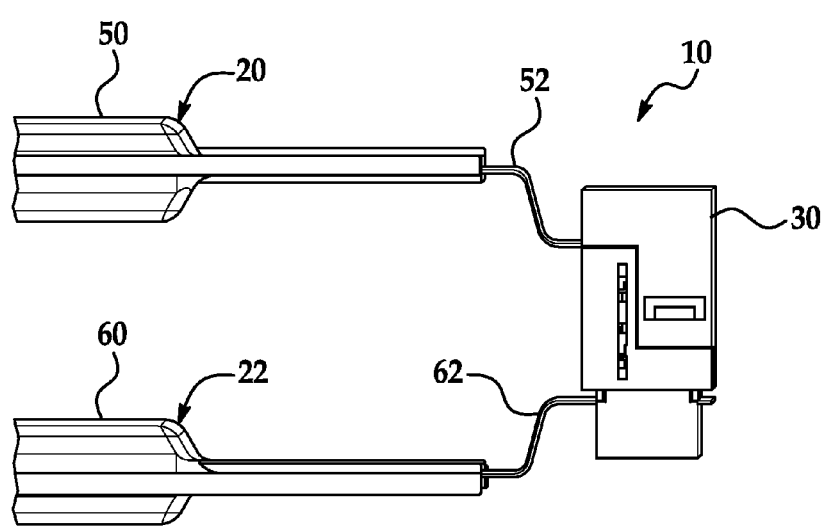
FIG. 2 is a cross-sectional schematic of a portion of the battery cell assembly of FIG. 1.
Figure 3:
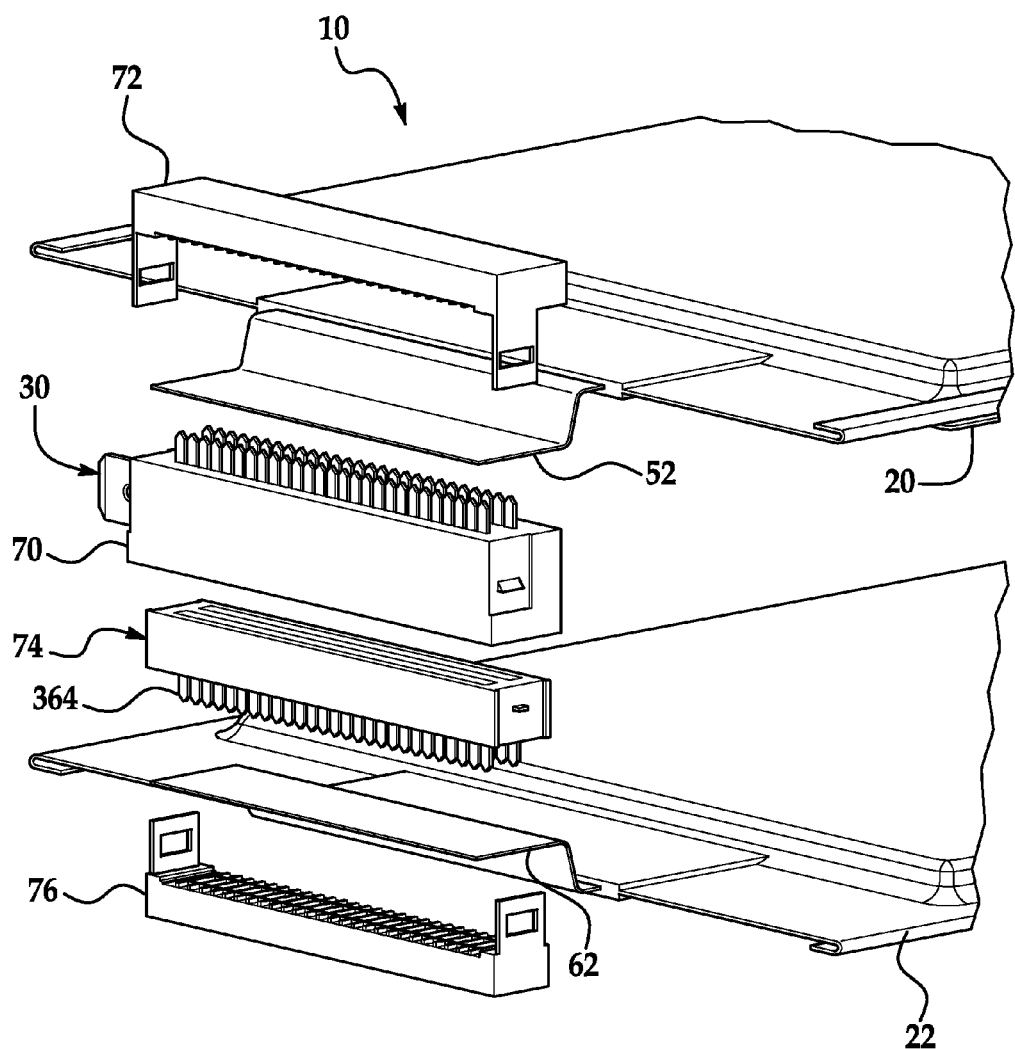
FIG. 3 is an exploded schematic of the electrical connector of FIG. 1.
Figure 4:
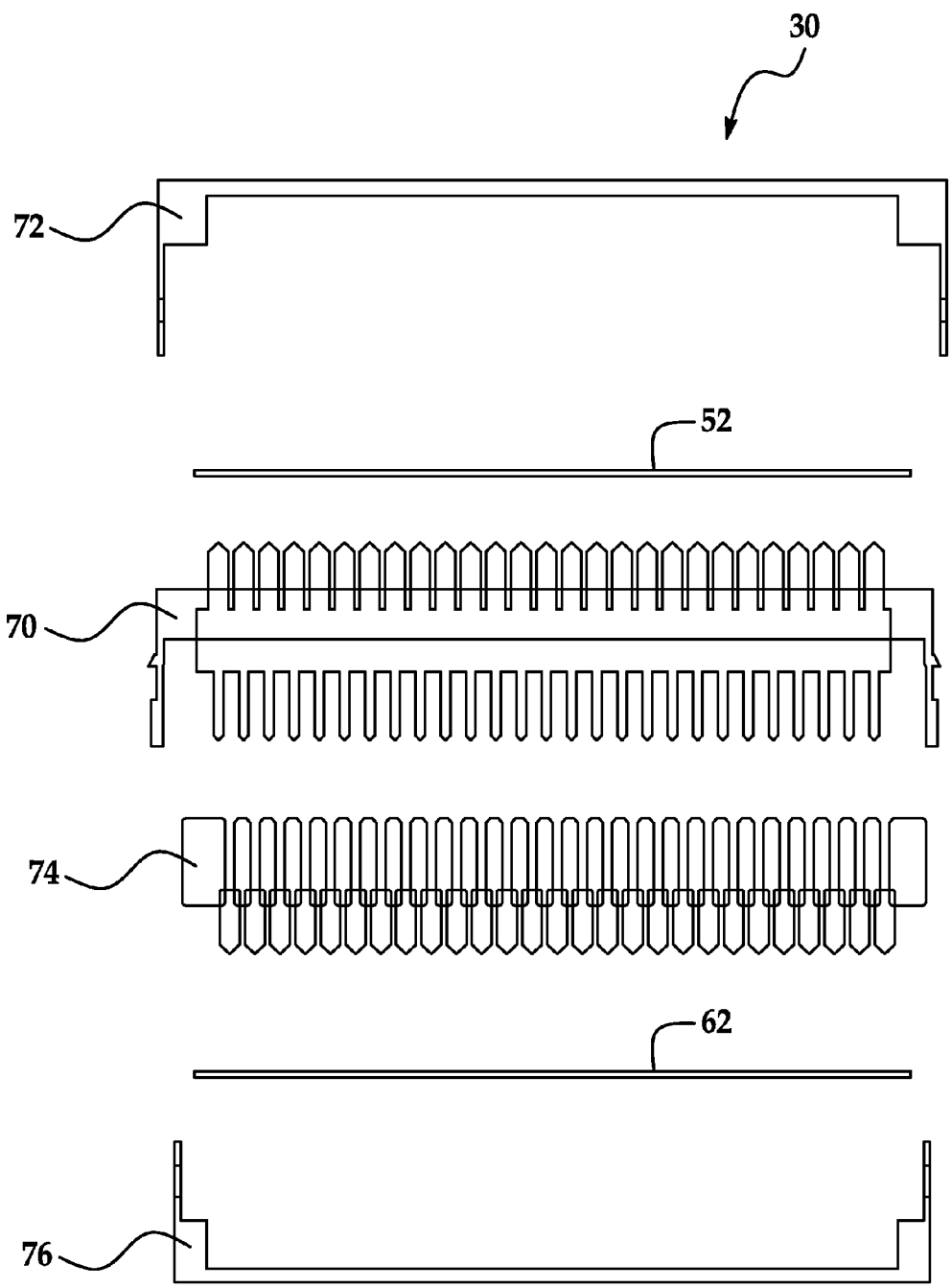
FIG. 4 is an exploded and cross-sectional schematic of the electrical connector of FIG. 1.
Figure 5:
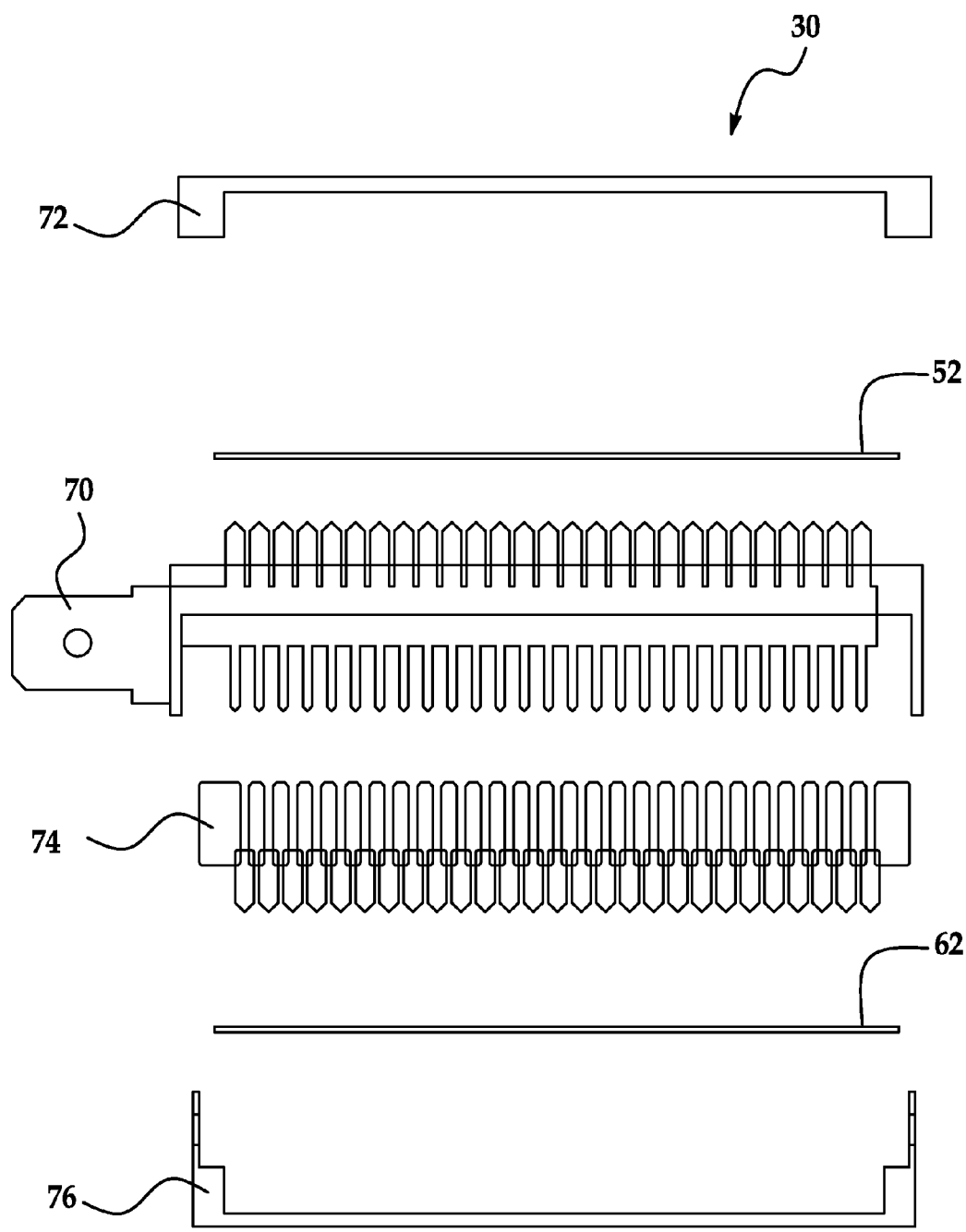
FIG. 5 is another exploded and cross-sectional schematic of the electrical connector of FIG. 1.
Figure 6:
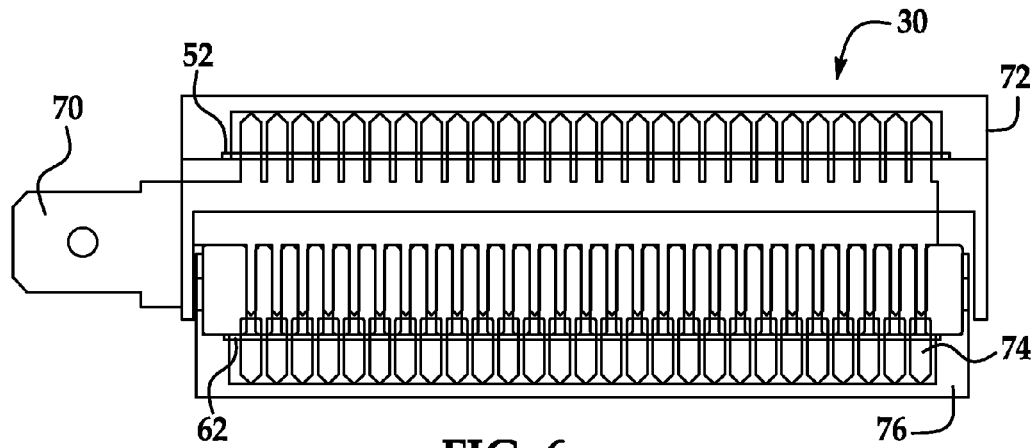
FIG. 6 is a cross-sectional schematic of the electrical connector of FIG. 1.
Figure 7:
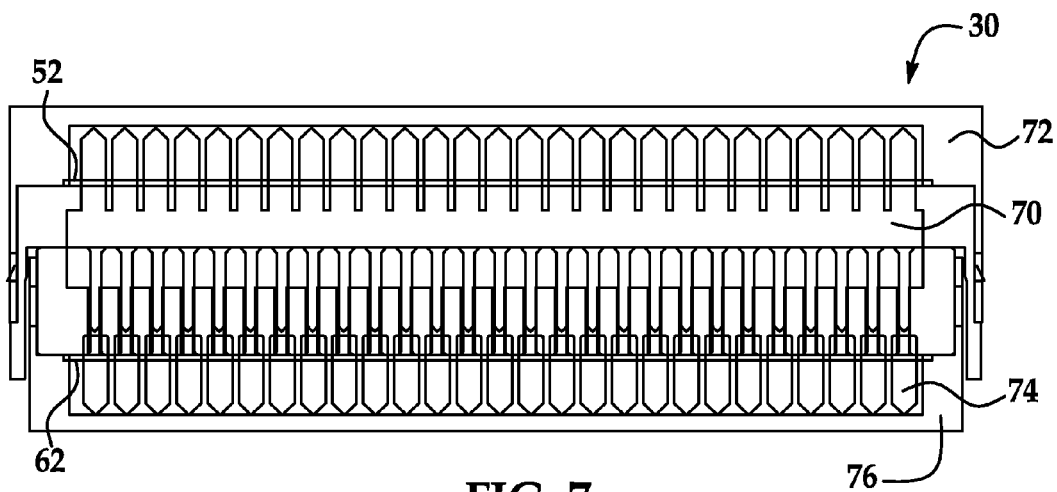
FIG. 7 is another cross-sectional schematic of the electrical connector of FIG. 1.
Figure 8:
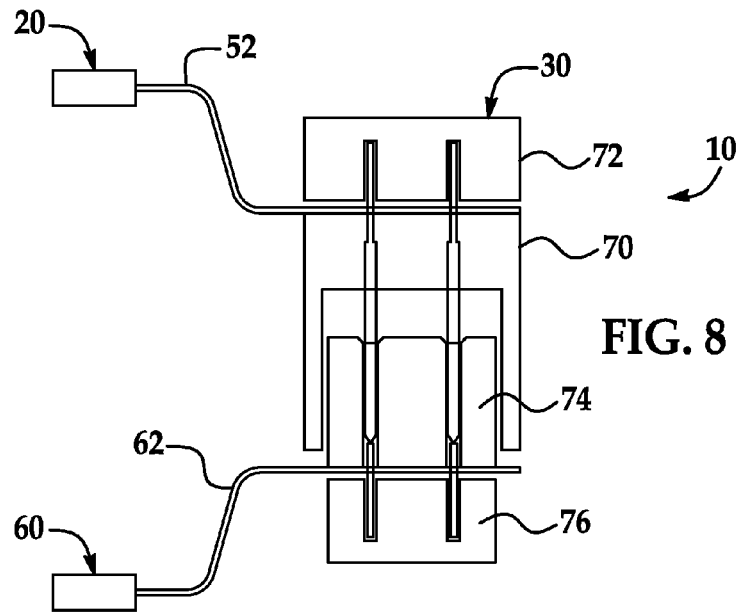
FIG. 8 is another cross-sectional schematic of the electrical connector of FIG. 1.
Figure 13:
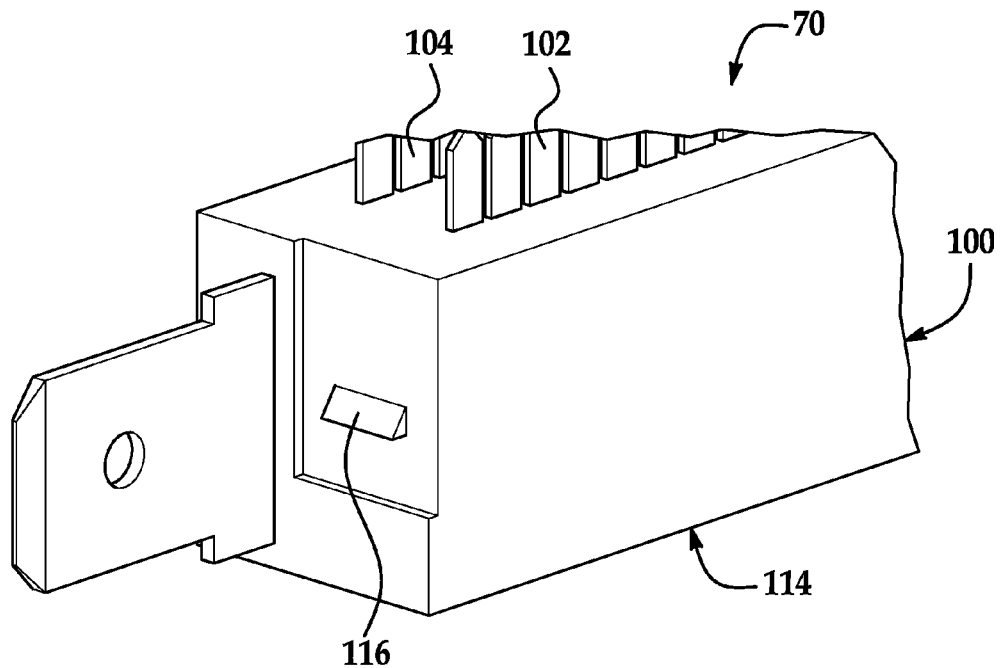
FIG. 13 is a schematic of an end portion of the first terminal assembly of FIG. 9.
Figure 14:
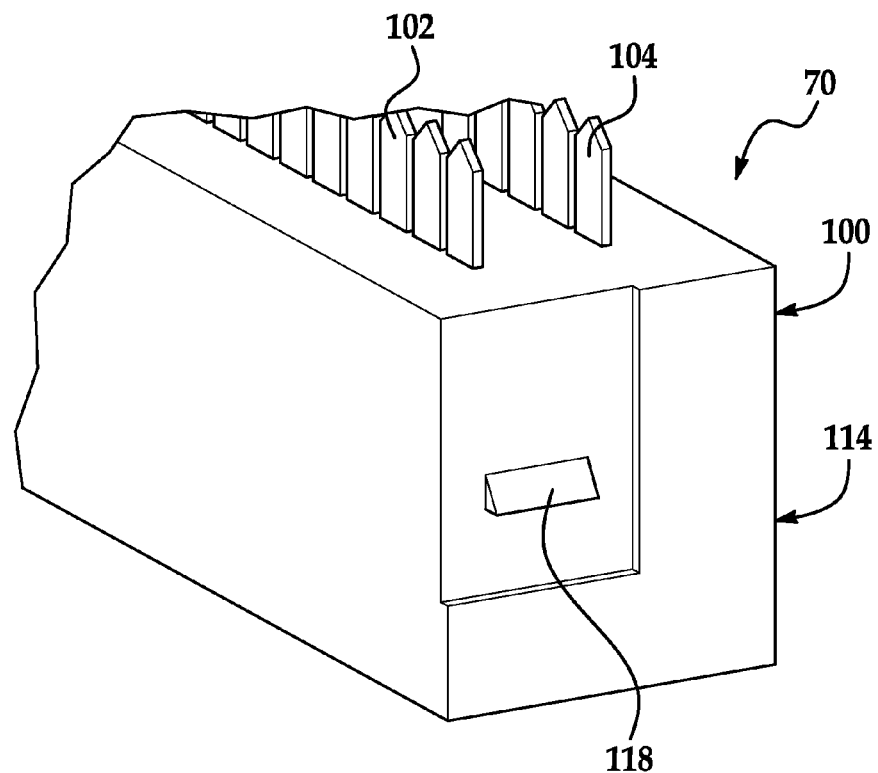
FIG. 14 is a schematic of another end portion of the first terminal assembly of FIG. 9.

Referring to FIGS. 2 and 3, the electrical connector 30 is provided to electrically and physically couple together the electrical terminals 52, 62 of the battery cells 20, 22, respectively. The electrical connector 30 includes a first terminal assembly 70, a first end cap 72, a second terminal assembly 74, and a second end cap 76.

Referring to FIGS. 3 and 9-14, the first terminal assembly 70 is configured to be removably coupled to the second terminal assembly 74 and the first end cap 72. The first terminal assembly 70 includes a housing 100, a first pin assembly 102, and a second pin assembly 104.

The housing 100 includes a body portion 114 and coupling tabs 116, 118 disposed on opposite ends of the body portion 114. The body portion 114 includes first, second, third, fourth, fifth, sixth sides 120, 122, 124, 126, 128, 130. The first and second sides 120, 122 are disposed substantially parallel to one another. Further, the third and fourth sides 124, 126 are disposed substantially parallel to one another and perpendicular to the first and second sides 120, 122. Still further, the fifth and sixth sides 128, 130 are disposed substantially parallel to one another and perpendicular to the first and second sides 120, 122. The body portion 114 includes a cut-out region 140 extending from the second side 122 into the body portion 114. In an exemplary embodiment, the housing 100 is constructed of plastic.

Referring to FIGS. 3, 9-12 and 15, the first pin assembly 102 is partially disposed in the body portion 114 and includes a first plurality of pins 160, a central member 162, and a second plurality of pins 164. The first pin assembly 102 is provided to puncture the electrical terminal 52 such that the first plurality of pins 160 extend through and are physically and electrically coupled to the electrical terminal 52. The first pin assembly 122 is further provided to electrically couple the first terminal assembly 70 to the second terminal assembly 74. The first pin assembly 102 is constructed of an electrically conductive material. For example, in an exemplary embodiment, the first pin assembly 102 can be constructed of at least one of copper, aluminum, steel, and tin.

The first plurality of pins 160 are coupled to and extend from a first side of the central member 162 in a first direction away from the central member 162. The first plurality of pins 160 are electrically coupled together. Each pin of the first plurality of pins 160 is disposed a predetermined longitudinal distance from an adjacent pin of the first plurality of pins 160. The longitudinal width of each pin of the first plurality of pins 160 is greater than a longitudinal width of each pin of the second plurality of pins 164. Further, the first plurality of pins 160 extend outwardly from the first side 120 (shown in FIG. 9) of the housing 100.

The second plurality of pins 164 are coupled to and extend from a second side of the central member 162 in a second direction away from the central member 162. The second plurality of pins 164 are electrically coupled together. Further, second plurality of pins 164 are electrically coupled to the first plurality of pins 160. Each pin of the second plurality of pins 164 is disposed a predetermined longitudinal distance from an adjacent pin of the second plurality of pins 162. The second direction is in an opposite direction relative to the first direction. The second plurality of pins 164 are disposed within the cut-out region 140 (shown in FIG. 10) of the housing 100. Further, the central member 162 is embedded within the body portion 114.

The second pin assembly 104 is partially disposed in the body portion 114 and is disposed a predetermined distance from the first pin assembly 102 and extends substantially parallel to the first pin assembly 102. The second pin assembly 104 includes a first plurality of pins 180, a central member 182, a second plurality of pins 184, and a voltage sensing extension portion 186. The second pin assembly 104 is provided to puncture the electrical terminal 52 such that the first plurality of pins 180 extend through and are physically and electrically coupled to the electrical terminal 52. The second pin assembly 104 is further provided to electrically couple the first terminal assembly 70 to the second terminal assembly 74. The second pin assembly 104 is constructed of an electrically conductive material. For example, in an exemplary embodiment, the second pin assembly 104 can be constructed of at least one of copper, aluminum, steel, and tin.

The first plurality of pins 180 are coupled to and extend from a first side of the central member 182 in a first direction away from the central member 182. The first plurality of pins 180 are electrically coupled together. Each pin of the first plurality of pins 180 is disposed a predetermined longitudinal distance from an adjacent pin of the first plurality of pins 180. The longitudinal width of each pin of the first plurality of pins 180 is greater than a longitudinal width of each pin of the second plurality of pins 184. Further, the first plurality of pins 180 extend outwardly from the first side 120 (shown in FIG. 9) of the housing 100.

The second plurality of pins 184 are coupled to and extend from a second side of the central member 182 in the second direction away from the central member 182. The second plurality of pins 184 are electrically coupled together. Further, the second plurality of pins 184 are electrically coupled to the first plurality of pins 180. Each pin of the second plurality of pins 184 is disposed a predetermined longitudinal distance from an adjacent pin of the second plurality of pins 182. The second plurality of pins 184 are disposed within the cut-out region 140 (shown in FIG. 10) of the housing 100. Further, the central member 182 is embedded within the body portion 114.

The voltage sensing extension portion 186 is integrally coupled to the central member 182 and extends outwardly from the third side 124 (shown in FIG. 10) of the body portion 114. The voltage sensing extension portion 186 has an aperture 137 extending therethrough. The voltage sensing extension portion 186 is advantageously provided to allow a computer to monitor a voltage and a temperature of the battery cells 20, 22.

Referring to FIGS. 3, 18 and 19, the first end cap 72 is removably attached to the first terminal assembly 70 to urge the electrical terminal 52 against the first plurality of pins 160 such that the first plurality of pins 160 extend through and contact the electrical terminal 52, and the electrical terminal 52 is held between the first end cap 72 and the first terminal assembly 70. The first end cap 72 includes an end cap portion 200 and first and second finger portions 202, 204. The first and second finger portions 202, 204 are coupled to first and second ends, respectively, of the end cap portion 200 and extend outwardly from the end cap portion 200 substantially perpendicular to the end cap portion 200. The first and second finger portions 202, 204 have apertures 212, 214, respectively, extending therethrough. The apertures 212, 214 are adapted to receive the coupling tabs 116, 118 (shown in FIGS. 9 and 10), respectively, of the housing 100 of the first terminal assembly 70. In an exemplary embodiment, the first end cap 72 is constructed of plastic.

Referring to FIGS. 3 and 20-27, the second terminal assembly 74 is configured to be removably coupled to the first terminal assembly 70 and the second end cap 72. The second terminal assembly 74 includes a housing 300, a first pin assembly 302, and a second pin assembly 304.

The housing 300 includes a body portion 314 and coupling tabs 316, 318 disposed on opposite ends of the body portion 314. The body portion 314 includes first, second, third, fourth, fifth, sixth sides 320, 322, 324, 326, 328, 330. The first and second sides 320, 322 are disposed substantially parallel to one another. Further, the third and fourth sides 324, 326 are disposed substantially parallel to one another and perpendicular to the first and second sides 320, 322. The body portion 314 includes a first plurality of apertures 340 extending therethrough from the first side 320 to the second side 322. The body portion 314 further includes a second plurality of apertures 342 extending therethrough from the first side 320 to the second side 322. In an exemplary embodiment, the housing 300 is constructed of plastic.

Referring to FIGS. 3, 15, 24 and 25, the first pin assembly 302 is partially disposed in the body portion 314 and includes a first plurality of female pins 360, a central member 362, and a second plurality of pins 364. The first pin assembly 302 is provided to puncture the electrical terminal 62 such that the second plurality of pins 364 extend through and are physically and electrically coupled to the electrical terminal 62. The first pin assembly 302 is further provided to electrically couple the second terminal assembly 74 to the first terminal assembly 70. The first pin assembly 302 is constructed of an electrically conductive material. For example, in an exemplary embodiment, the first pin assembly 302 can be constructed of at least one of copper, aluminum, steel, and tin.

Figure 15:
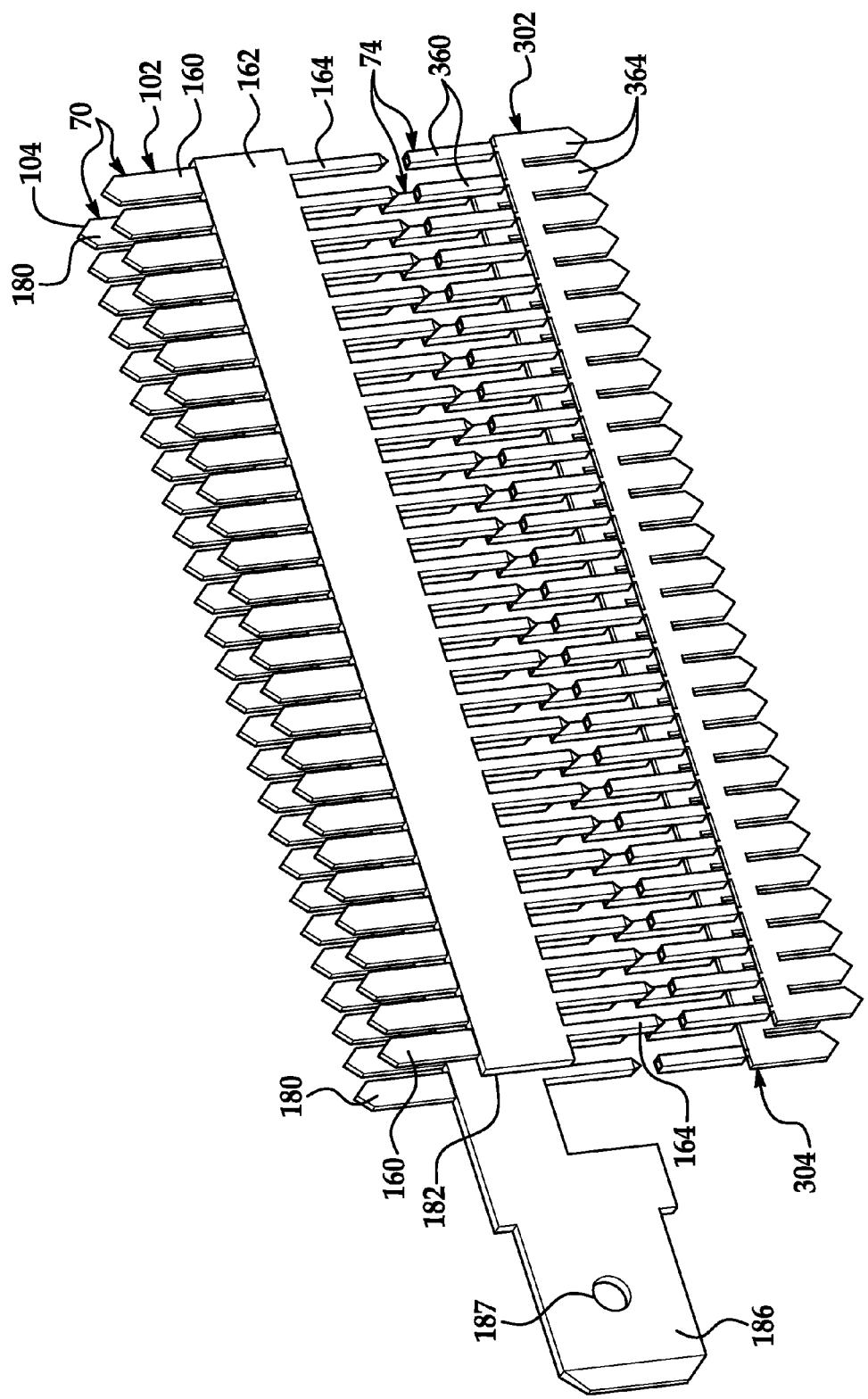
FIG. 15 is a schematic of portions of a first terminal assembly and a second terminal assembly utilized in the electrical connector of FIG. 1.
Figure 16:
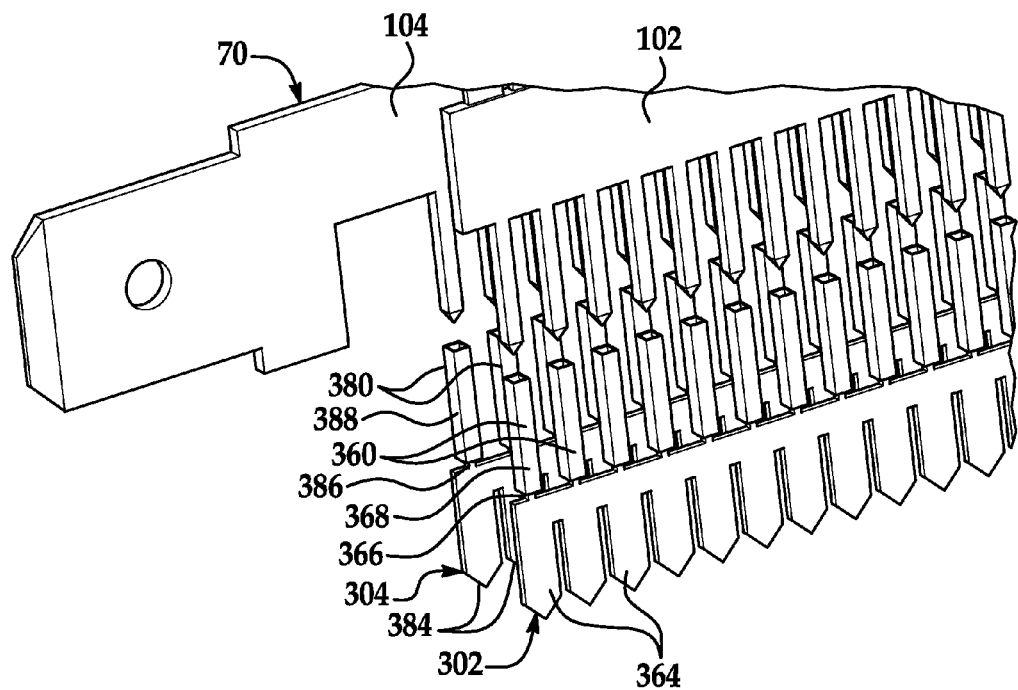
FIG. 16 is an enlarged schematic of portions of the first terminal assembly and the second terminal assembly of FIG. 15 having an uncoupled operational position.
Figure 17:
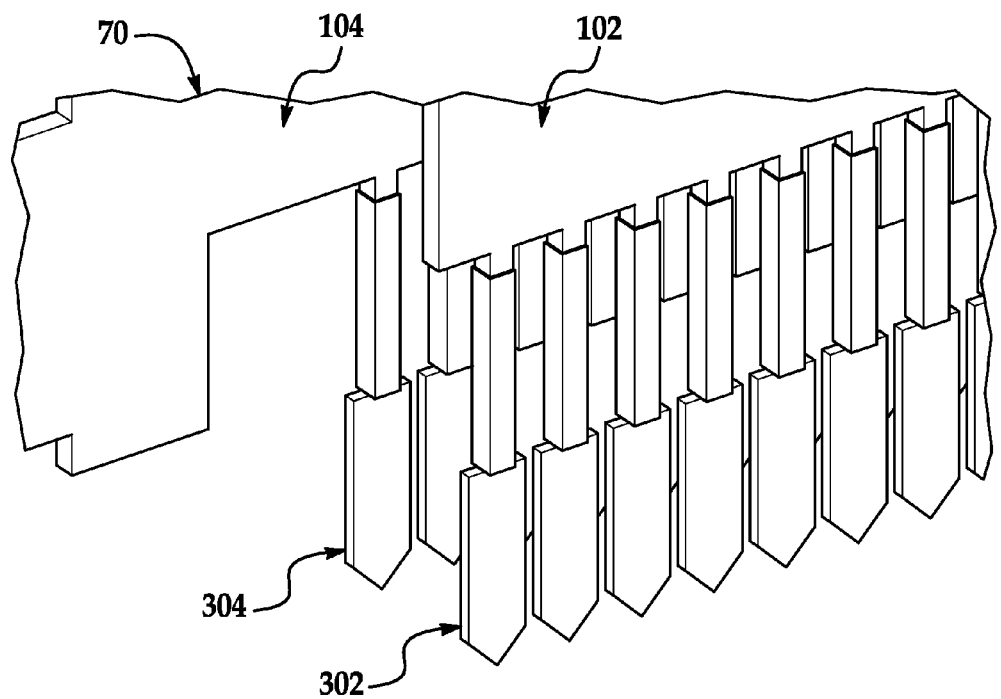
FIG. 17 is another enlarged schematic of portions of the first terminal assembly and the second terminal assembly of FIG. 15 having a coupled operational position.
Figure 22:
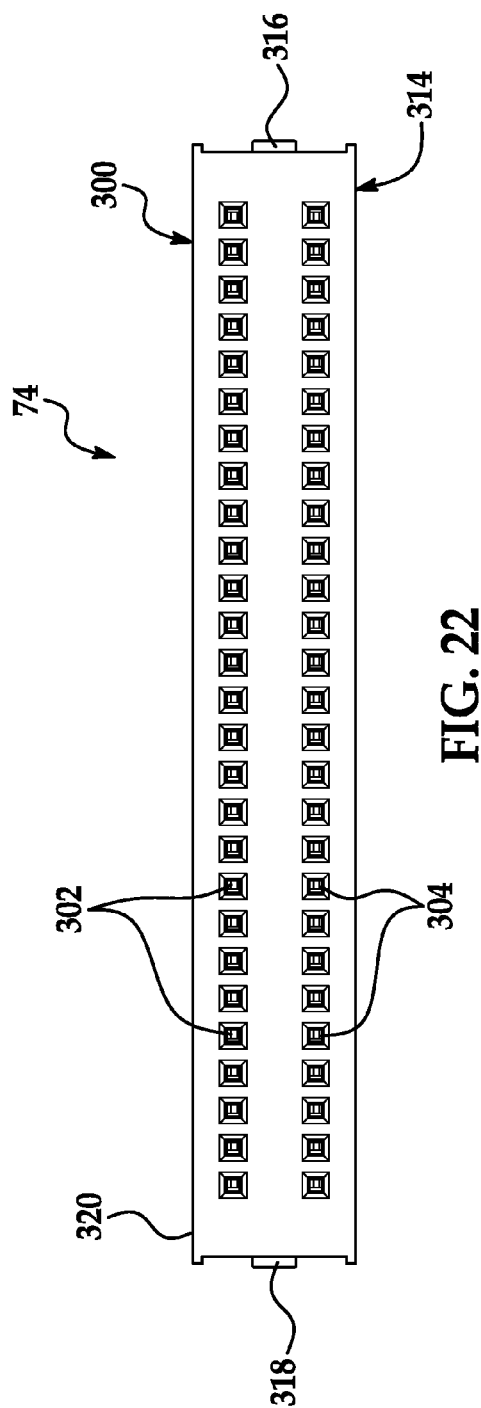
FIG. 22 is a top view of the second terminal assembly of FIG. 20.
Figure 23:
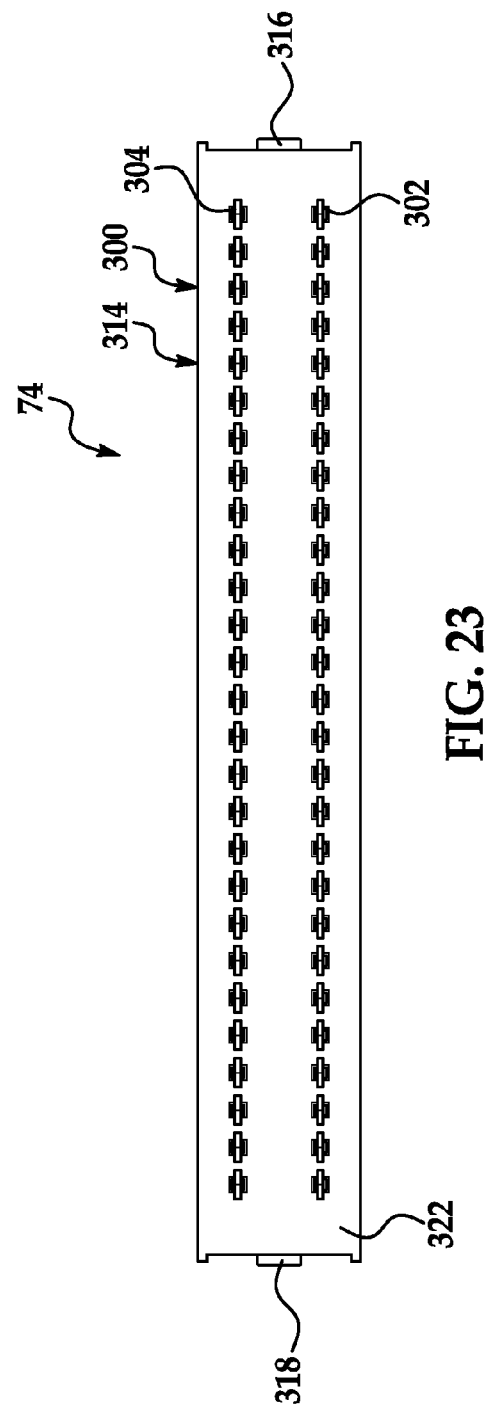
FIG. 23 is a bottom view of the second terminal assembly of FIG. 20.
Figure 26:
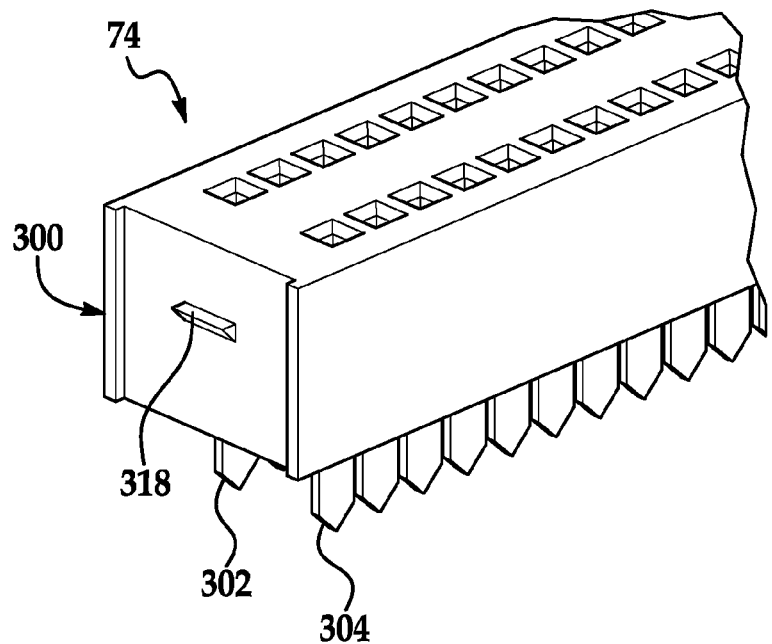
FIG. 26 is a schematic of an end portion of the second terminal assembly of FIG. 20.
Figure 27:
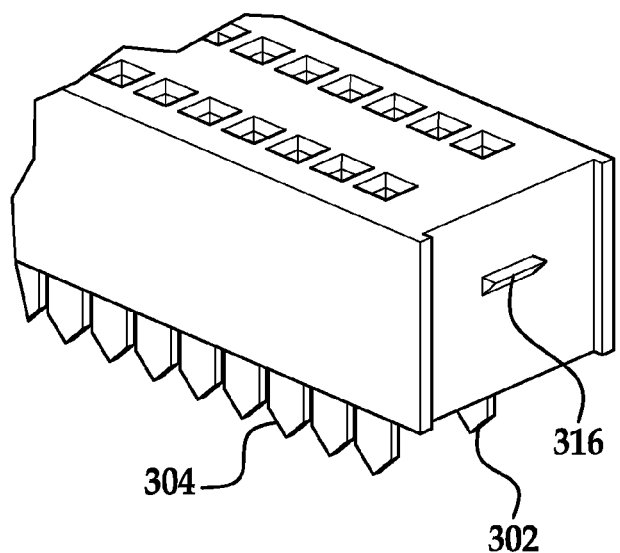
FIG. 27 is a schematic of another end portion of the second terminal assembly of FIG. 20.

Referring to FIGS. 15, 20 and 24, the first plurality of female pins 360 are configured to receive the second plurality of pins 164 of the first pin assembly 102 therein. The first plurality of female pins 360 are coupled to and extend from a first side of the central member 362 in a first direction away from the central member 362. The first plurality of female pins 360 are electrically coupled together. Each pin of the first plurality of female pins 360 is disposed a predetermined longitudinal distance from an adjacent pin of the first plurality of female pins 360. The longitudinal width of each pin of the first plurality of female pins 360 is less than a longitudinal width of each pin of the second plurality of pins 364. Further, each female pin of the first plurality of female pins 360 are disposed in a respective aperture of the first plurality of apertures 340 (shown in FIG. 20) in the body portion 314. In an exemplary embodiment, each female pin of the first plurality of female pins 360 has a portion 366 (shown in FIG. 16) having a smaller diameter proximate to the central member 362 then a remaining portion 368 of each respective female pin distal from the central member 362. The portion 366 of each female pin of the first plurality of female pins 360 having the smaller diameter can be used as an overcurrent interrupt device that transitions from a closed electrical state to an open electrical state if the electrical current flowing through the respective portion 366 of each female pin of the first plurality of female pins 360 is greater than the threshold current level for a predetermined amount of time.

The second plurality of pins 364 are coupled to and extend from a second side of the central member 362 in a second direction away from the central member 362. The second plurality of pins 364 are electrically coupled together. Further, the second plurality of pins 364 are electrically coupled to the first plurality of pins 360. Each pin of the second plurality of pins 364 is disposed a predetermined longitudinal distance from an adjacent pin of the second plurality of pins 362. Further, the central member 362 is embedded within the body portion 314.

The second pin assembly 304 is partially disposed in the body portion 314 and is disposed a predetermined distance from the first pin assembly 302 and extends substantially parallel to the first pin assembly 302. The second pin assembly 304 includes a first plurality of female pins 380, a central member 382, and a second plurality of pins 384. The second pin assembly 304 is provided to puncture the electrical terminal 62 such that the second plurality of pins 384 extend through and are physically and electrically coupled to the electrical terminal 62. The second pin assembly 304 is further provided to electrically couple the second terminal assembly 74 to the first terminal assembly 70. The second pin assembly 304 is constructed of an electrically conductive material. For example, in an exemplary embodiment, the second pin assembly 304 can be constructed of at least one of copper, aluminum, steel, and tin.

The first plurality of female pins 380 are coupled to and extend from a first side of the central member 382 in a first direction away from the central member 382. The first plurality of female pins 380 are electrically coupled together. Each pin of the first plurality of female pins 380 is disposed a predetermined longitudinal distance from an adjacent pin of the first plurality of female pins 380. The longitudinal width of each pin of the first plurality of female pins 380 is less than a longitudinal width of each pin of the second plurality of pins 384. Further, the first plurality of pins 380 extend outwardly from the first side 320 (shown in FIG. 20) of the housing 100. In an exemplary embodiment, each female pin of the first plurality of female pins 380 has a portion 386 (shown in FIG. 16) having a smaller diameter proximate to the central member 382 then a remaining portion 388 of each respective female pin distal from the central member 382. The portion 386 of each female pin of the first plurality of female pins 380 having the smaller diameter can be used as an overcurrent interrupt device that transitions from a closed electrical state to an open electrical state if the electrical current flowing through the respective portion 386 of each female pin of the first plurality of female pins 380 is greater than the threshold current level for a predetermined amount of time.

The second plurality of pins 384 are coupled to and extend from a second side of the central member 382 in the second direction away from the central member 382. The second plurality of pins 384 are electrically coupled together. Further, second plurality of pins 384 are electrically coupled to the first plurality of pins 380. Each pin of the second plurality of pins 384 is disposed a predetermined longitudinal distance from an adjacent pin of the second plurality of pins 382. Further, the central member 382 is embedded within the body portion 314 (shown in FIG. 20).

Figure 28:
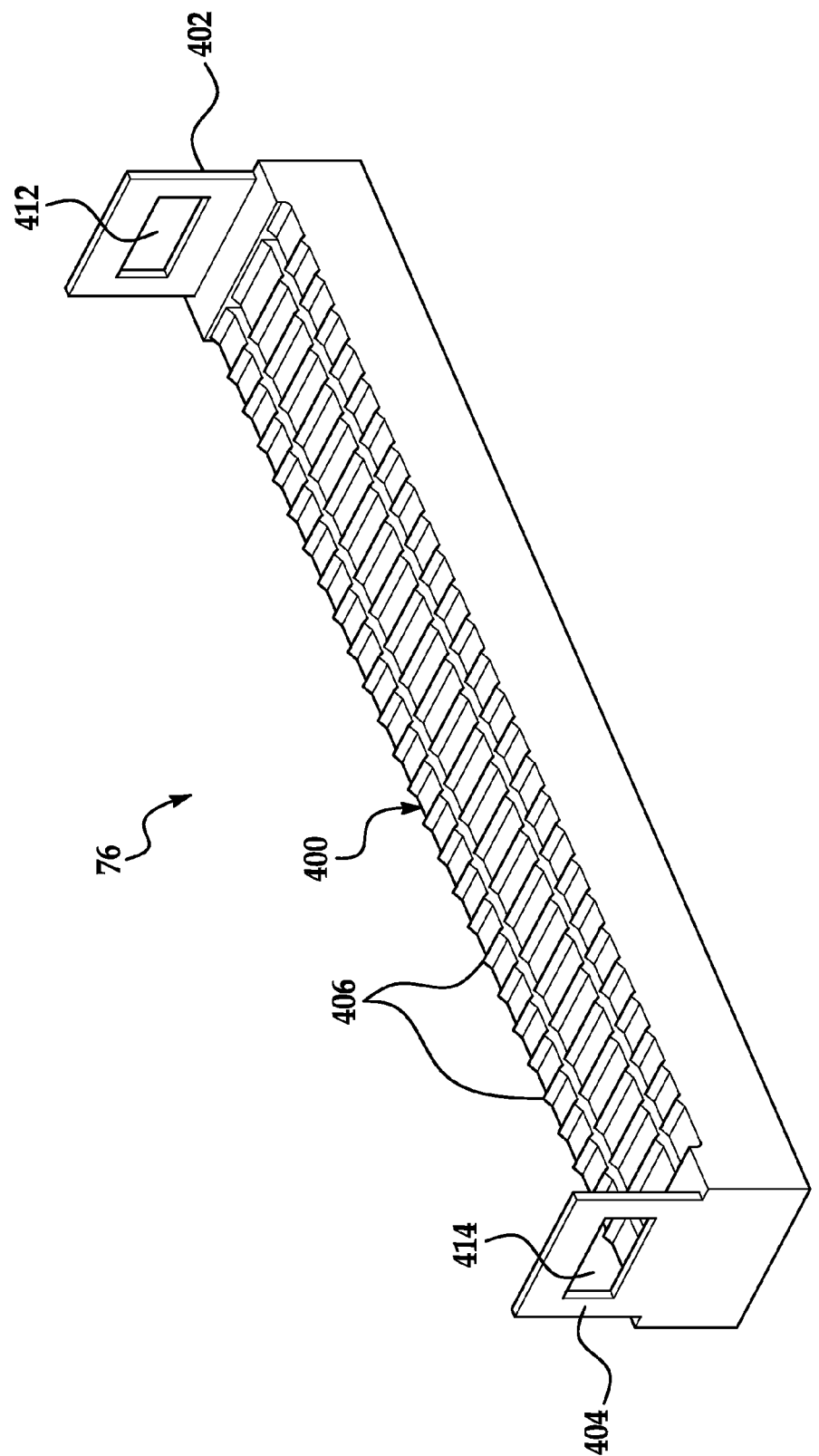
FIG. 28 is a schematic of a second end cap utilized in the electrical connector of FIG. 1.

Referring to FIGS. 3 and 28, the second end cap 76 is removably attached to the second terminal assembly 74. The second end cap 76 is positioned to urge the electrical terminal 62 against the second plurality of pins 384 and the second plurality of pins 364 such that the second plurality of pins 384 and the second plurality pins 364 extend through and contact the electrical terminal 62, and the electrical terminal 62 is held between the second end cap 76 and the second terminal assembly 74. The second end cap 76 includes an end cap portion 400 and first and second finger portions 402, 404. The first and second finger portions 402, 404 are coupled to first and second ends, respectively, of the end cap portion 400 and extend outwardly from the end cap portion 400 substantially perpendicular to the end cap portion 400. The first and second finger portions 402, 404 have apertures 412, 414, respectively, extending therethrough. The apertures 412, 414 are adapted to receive the coupling tabs 316, 318, respectively, of the housing 300 of the second terminal assembly 74. In an exemplary embodiment, the second end cap 76 is constructed of plastic.

Figure 29:
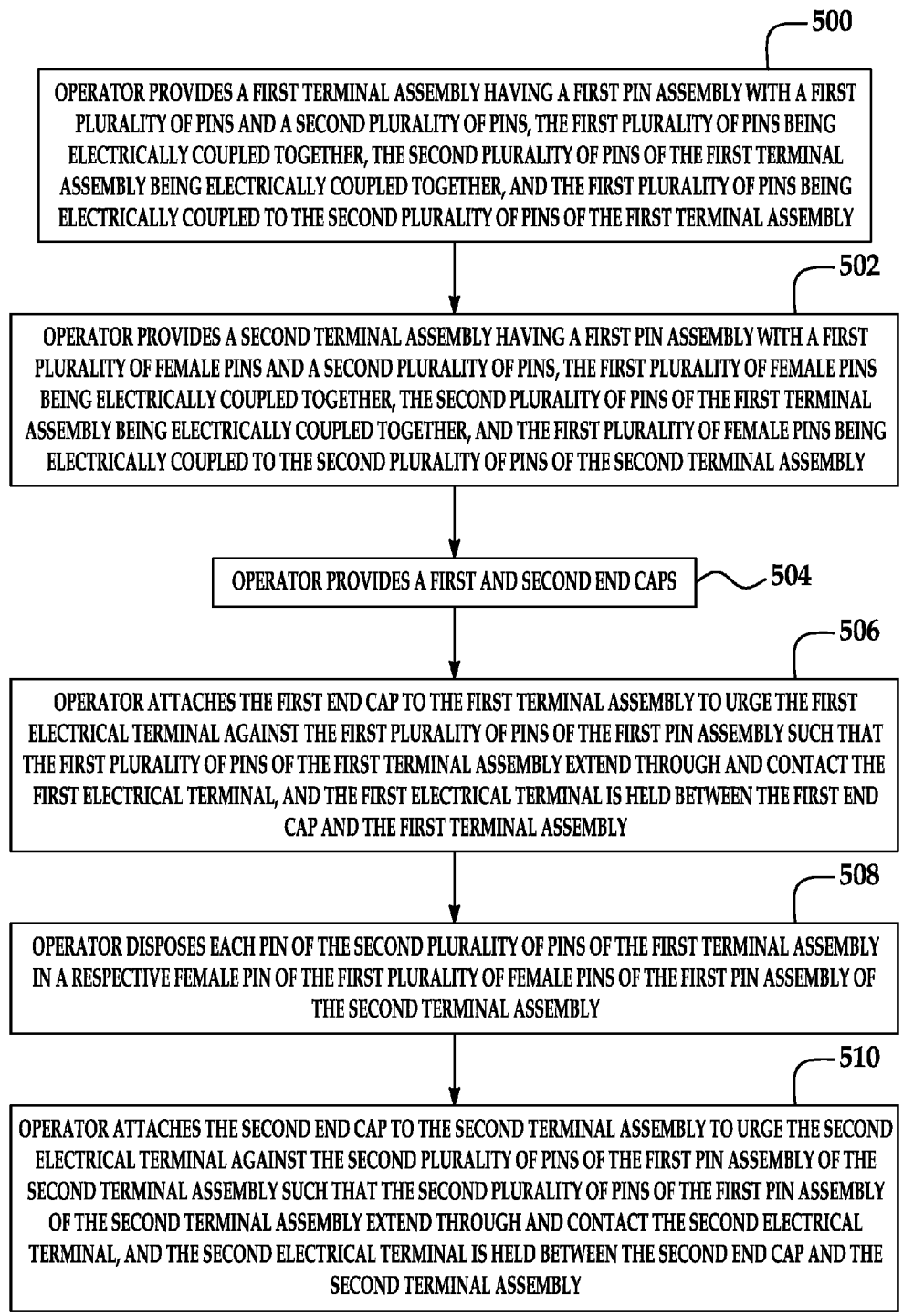
FIG. 29 is a flowchart of a method for coupling first and second electrical terminals of first and second battery cells, respectively, to one another, in accordance with another exemplary embodiment.

Referring to FIGS. 3, 15 and 29, a flowchart of a method of electrically coupling the electrical terminals 52, 62 of the battery cells 20, 22, respectively, to one another, in accordance with another exemplary embodiment is provided.

At step 500, an operator provides the first terminal assembly 70 having the first pin assembly 102 with the first plurality of pins 160 and the second plurality of pins 164. The first plurality of pins 160 are electrically coupled together. The second plurality of pins 164 of the first terminal assembly 70 are electrically coupled together, and the first plurality of pins 160 are electrically coupled to the second plurality of pins 164 of the first terminal assembly 70.

At step 502, the operator provides the second terminal assembly 74 having the first pin assembly 302 with the first plurality of female pins 360 and the second plurality of pins 364. The first plurality of female pins 360 are electrically coupled together. The second plurality of pins 364 of the second terminal assembly 74 are electrically coupled together, and the first plurality of female pins 360 are electrically coupled to the second plurality of pins 364 of the second terminal assembly 74.

At step 504, the operator provides the first and second end caps 72, 76.

At step 506, the operator attaches the first end cap 72 to the first terminal assembly 70 to urge the first electrical terminal 52 against the first plurality of pins 160 of the first pin assembly 102 such that the first plurality of pins 160 of the first terminal assembly 70 extend through and contact the first electrical terminal 52, and the first electrical terminal 52 is held between the first end cap 72 and the first terminal assembly 70.

At step 508, the operator disposes each pin of the second plurality of pins 164 of the first terminal assembly 70 in a respective female pin of the first plurality of female pins 360 of the first pin assembly 302 of the second terminal assembly 74.

At step 510, the operator attaches the second end cap 76 to the second terminal assembly 74 to urge the second electrical terminal 54 against the second plurality of pins 364 of the first pin assembly 302 of the second terminal assembly 74 such that the second plurality of pins 364 of the first pin assembly 302 of the second terminal assembly 74 extend through and contact the second electrical terminal 54, and the second electrical terminal 54 is held between the second end cap 76 and the second terminal assembly 74.

The electrical connector and the method of electrically coupling first and second electrical terminals of first and second battery cells, respectively, to one another provide a substantial advantage over other electrical connectors and methods. In particular, the electrical connectors utilize a first terminal assembly having a plurality of pins that are electrically coupled together that extend through and contact a first electrical terminal of the first battery cell, and a second terminal assembly having a plurality of pins that are electrical coupled together that extend through and contact a second electrical terminal of the second battery cell to electrically couple the first and second battery cells to one another.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An electrical connector, comprising:
a first terminal assembly having a first pin assembly with first, second, third, fourth, fifth, and sixth pins and a first single central conductive member; the first, second, and third pins of the first pin assembly of the first terminal assembly being coupled to and extending in a first direction from the first single central conductive member; the fourth, fifth, and sixth pins of the first pin assembly of the first terminal assembly being coupled to and extending in a second direction from the first single central conductive member; the second direction being opposite to the first direction; the first, second, third, fourth, fifth, and sixth pins of the first pin assembly of the first terminal assembly being electrically coupled together;
a first end cap being removably attached to the first terminal assembly to urge a first electrical terminal against the first, second, and third pins of the first pin assembly of the first terminal assembly such that the first, second, and third pins of the first pin assembly of the first terminal assembly extend through and contact the first electrical terminal, and the first electrical terminal is held between the first end cap and the first terminal assembly;
a second terminal assembly having a first pin assembly with first, second, and third female pins, and first, second, and third pins and a second single central conductive member; the first, second, and third female pins of the first pin assembly of the second terminal assembly being coupled to and extending in the first direction from the second single central conductive member; the first, second, and third pins of the first pin assembly of the second terminal assembly being coupled to and extending in the second direction from the second single central conductive member; the first, second, and third female pins and the first, second, and third pins of the first pin assembly of the second terminal assembly being electrically coupled together; the first, second, and third female pins of the first pin assembly of the second terminal assembly receiving the fourth, fifth, and sixth pins, respectively, of the first pin assembly of the first terminal assembly therein; and a second end cap being removably attached to the second terminal assembly to urge a second electrical terminal against the first, second, and third pins of the first pin assembly of the second terminal assembly such that the first, second, and third pins of the first pin assembly of the second terminal assembly extend through and contact the second electrical terminal, and the second electrical terminal is held between the second end cap and the second terminal assembly.

2. The electrical connector of claim 1, wherein the first terminal assembly further having a first housing with a first side and a second side, the first housing having a cut-out region extending from the second side into the first housing.

3. The electrical connector of claim 2, wherein:
the first housing further includes a body portion and first and second coupling tabs, the first and second coupling tabs being disposed on first and second ends, respectively, of the body portion; and
the first end cap further includes an end cap portion and first and second finger portions; the first and second finger portions being coupled to first and second ends, respectively, of the end cap portion and extending outwardly from the end cap portion substantially perpendicular to the end cap portion; the first and second finger portions having first and second apertures, respectively, extending therethrough; the first and second apertures being adapted to receive the first and second coupling tabs, respectively, of the first housing of the first terminal assembly.

4. The electrical connector of claim 2, wherein:
the first single central conductive member being disposed within the first housing; and
the first, second, and third pins of the first pin assembly of the first terminal assembly further extending outwardly from the first side of the first housing.

5. The electrical connector of claim 4, wherein:
the fourth, fifth, and sixth pins of the first pin assembly of the first terminal assembly being disposed within the cut-out region of the first housing.

6. The electrical connector of claim 5, wherein:
the second terminal assembly further includes a second housing; the second housing having a first side and a second side and first, second, and third apertures extending through the second housing from the first side to the second side thereof; the second single central conductive member being disposed within the second housing; and
the first, second, and third female pins of the first pin assembly of the second terminal assembly being disposed in the first, second, and third apertures, respectively, in the second housing.

7. The electrical connector of claim 6, wherein:
the second housing of the second terminal assembly further includes a body portion and first and second coupling tabs, the first and second coupling tabs being disposed on first and second ends, respectively, of the body portion; and
the second end cap further includes an end cap portion and first and second finger portions; the first and second finger portions being coupled to first and second ends, respectively, of the end cap portion and extending outwardly from the end cap portion substantially perpendicular to the end cap portion; the first and second finger portions having fourth and fifth apertures, respectively, extending therethrough; the fourth and fifth apertures being adapted to receive the first and second coupling tabs, respectively of the second housing of the second terminal assembly.

8. The electrical connector of claim 6, wherein:
the first, second, and third pins of the first pin assembly of the second terminal assembly further extending outwardly from the second side of the second housing.

9. The electrical connector of claim 1, wherein:
the first terminal assembly further includes a second pin assembly with first, second, third, fourth, fifth, and sixth pins, a third single central conductive member, and a voltage sensing extension portion; the first, second, and third pins of the second pin assembly of the first terminal assembly being coupled to and extending in the first direction from the third single central conductive member; the fourth, fifth, and sixth pins of the second pin assembly of the first terminal assembly being coupled to and extending in the second direction from the third single central conductive member; the voltage sensing extension portion being coupled to and extending from the third single central conductive member; the first, second, third, fourth, fifth, and sixth pins of the second pin assembly of the first terminal assembly being electrically coupled together; the second pin assembly of the first terminal assembly being disposed a predetermined distance from the first pin assembly of the first terminal assembly in the first housing; and
the first end cap being further adapted to urge the first electrical terminal against the first, second, and third pins of the second pin assembly of the first terminal assembly such that the first, second, and third pins of the second pin assembly of the first terminal assembly extend through and contact the first electrical terminal.

10. The electrical connector of claim 9, wherein:
the second terminal assembly further includes a second pin assembly with first, second, third female pins, and first, second, and third pins, and a fourth single central conductive member; the first, second, and third female pins of the second pin assembly of the second terminal assembly being coupled to and extending in the first direction from the fourth single central conductive member; the first, second, and third pins of the second pin assembly of the second terminal assembly being coupled to and extending in the second direction from the fourth single central conductive member; the first, second, and third female pins and the first, second, and third pins of the second pin assembly of the second terminal assembly being electrically coupled together; the first, second, and third female pins of the second pin assembly of the second terminal assembly receiving the fourth, fifth, and sixth pins, respectively, of the second pin assembly of the first terminal assembly therein; and the second end cap being further adapted to urge the first electrical terminal against the first, second, and third pins of the second pin assembly of the second terminal assembly such that the first, second, and third pins of the second pin assembly of the second terminal assembly extend through and contact the second electrical terminal.

11. The electrical connector of claim 10, wherein the first pin assembly of the second terminal assembly being disposed a predetermined distance from the second pin assembly of the second terminal assembly.

12. A method of electrically coupling first and second electrical terminals of first and second battery cells, respectively, to one another, comprising:

provided a first terminal assembly having a first pin assembly with first, second, third, fourth, fifth, and sixth pins and a first single central conductive member; the first, second, and third pins of the first pin assembly of the first terminal assembly being coupled to and extending in a first direction from the first single central conductive member; the fourth, fifth, and sixth pins of the first pin assembly of the first terminal assembly being coupled to and extending in a second direction from the first single central conductive member; the second direction being opposite to the first direction; the first, second, third, fourth, fifth, and sixth pins of the first pin assembly of the first terminal assembly being electrically coupled together;

providing a second terminal assembly having a first pin assembly with first, second, third female pins, and first, second, and third pins and a second single central conductive member; the first, second, and third female pins of the first pin assembly of the second terminal assembly being coupled to and extending in the first direction from the second single central conductive member; the first, second, and third pins of the first pin assembly of the second terminal assembly being coupled to and extending in the second direction from the second single central conductive member; the first, second, and third female pins and the first, second, and third pins of the first pin assembly of the second terminal assembly being electrically coupled together; the first, second, and third female pins of the first pin assembly of the second terminal assembly receiving the fourth, fifth, and sixth pins, respectively, of the first pin assembly of the first terminal assembly therein;

attaching the first end cap to the first terminal assembly to urge the first electrical terminal against the first, second, and third pins of the first pin assembly of the first terminal assembly such that the first, second, and third pins of the first pin assembly of the first terminal assembly extend through and contact the first electrical terminal, and the first electrical terminal is held between the first end cap and the first terminal assembly;

disposing the fourth, fifth, and sixth pins of the first pin assembly of the first terminal assembly in the first, second, and third female pins, respectively, of the first pin assembly of the second terminal assembly; and attaching the second end cap to the second terminal assembly to urge the second electrical terminal against the first, second, and third pins of the first pin assembly of the second terminal assembly such that the first, second, and third pins of the first pin assembly of the second terminal assembly extend through and contact the second electrical terminal, and the second electrical terminal is held between the second end cap and the second terminal assembly.

* * * * *